(12) United States Patent
Ishii

(10) Patent No.: US 6,774,599 B2
(45) Date of Patent: Aug. 10, 2004

(54) SERVO ACTUATOR AND POSITION SENSOR

(75) Inventor: Shinji Ishii, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/332,739

(22) PCT Filed: May 10, 2002

(86) PCT No.: PCT/JP02/04549

§ 371 (c)(1),
(2), (4) Date: Jan. 10, 2003

(87) PCT Pub. No.: WO02/093112

PCT Pub. Date: Nov. 21, 2002

(65) Prior Publication Data

US 2003/0146727 A1 Aug. 7, 2003

(30) Foreign Application Priority Data

May 11, 2001 (JP) ......................................... 2001-141372

(51) Int. Cl.[7] ................................................. G05B 1/06
(52) U.S. Cl. ...................... 318/652; 318/705; 318/714; 318/715
(58) Field of Search ................................ 318/705, 714, 318/715, 652

(56) References Cited

U.S. PATENT DOCUMENTS 4,138,632 A * 2/1979 Pauwels et al. ............. 318/599
4,604,575 A * 8/1986 Shimizu et al. .......... 324/207.18
4,754,220 A * 6/1988 Shimizu et al. .......... 324/207.18
5,252,902 A * 10/1993 Uehara et al. ............... 318/599
5,744,926 A * 4/1998 Lai et al. ..................... 318/590
5,982,135 A   11/1999 Pyo ............................. 318/701
2002/0110155 A1 * 8/2002 Pearce et al. ................ 370/519

FOREIGN PATENT DOCUMENTS

| CA | 1195917 A | 10/1998 |
|---|---|---|
| JP | 10-285987 | 10/1998 |
| JP | 2000-78881 | 3/2000 |
| JP | 2000-299970 | 10/2000 |
| KR | 20-0170195 | 11/1999 |

* cited by examiner

Primary Examiner—Rita Leykin
(74) Attorney, Agent, or Firm—Frommer Lawrence & Haug LLP; William S. Frommer

(57) ABSTRACT

In an actuator having an integrated drive circuit, a switching current flowing in a coil within the actuator is included in a position sensor signal of the actuator. According to the present invention, by arranging a detection circuit which performs sampling in synchronization with noise, a rotational position which does not include higher harmonic waves can be detected even if the switching noise in a motor coil current in the actuator itself is generated. Consequently, elimination of the influence of the noise allows posture and position control with less vibration to be realized.

12 Claims, 10 Drawing Sheets

SERVO ACTUATOR AND POSITION SENSOR

TECHNICAL FIELD

The present invention relates to servo actuators applicable to multi-axis drive machinery, such as robots, general purpose assembly equipment, robot hands, and other, types of multi-axis controllers. In particular, the present invention relates to a servo actuator and a position detector therefor that can detect the posture and position of a rotation axis with high accuracy.

More specifically, the present invention relates to a servo actuator including a drive circuit and to a position detector for the servo actuator. In particular, the present invention relates to a servo actuator and a position detector therefor that detect the posture and position of a rotation axis with high accuracy without being affected by switching noise in a coil current from the drive circuit.

BACKGROUND ART

Machinery that performs in a manner similar to human behavior using electric or magnetic operations is called a "robot". It is said that the term "robot" derives from the Slavic word "ROBOTA (slave machine)". In Japan, robots have become widely used since the late 1960's. Many of them are industrial robots, such as manipulators and transfer robots, designed for the purpose of automation of production operations and unmanned production operations in factories.

Stationary robots, such as arm robots, which are installed and used in particular places, operate only in a fixed and local workspace for assembly and selection of parts. In contrast, the workspace of mobile robots is not limited. Mobile robots move along a predetermined path or move freely. Therefore, mobile robots can perform predetermined or any human operations in place of human beings and can offer various services replacing human beings, dogs, and other living things. Among mobile robots, although legged mobile robots are less stable and have more difficulty in posture control and walking control compared to crawler robots and robots with tires, legged mobile robots are better in that they can climb up and down stairs and over obstacles, and can flexibly walk and run regardless whether the ground is prepared or unprepared.

Recently, research and development on legged mobile robots, such as pet robots which emulate the physical mechanisms and operations of quadrupedal walking animals such as dogs and cats, and "humanoid" or "human-shaped" robots (humanoid robots) designed on the model of the physical mechanisms and operations of bipedal upright walking animals such as human beings, has advanced. There are increasing expectations for the practical use of legged mobile robots. For example, Sony Corporation released a bipedal walking humanoid robot "SDR-3X" on Nov. 21, 2000.

Generally, a legged mobile robot of this type is equipped with many joint degrees-of-freedom, and movements of joints can be realized by actuator motors. Also, servo control is performed by calculating the rotational position and speed of each motor, thus reproducing desirable operation patterns and performing posture control.

In general, servo motors are used for realizing joint degrees-of-freedom for robots because servo motors are easy to handle, provide high torque with a compact body, and have excellent response. In particular, AC servo motors have no brush and are maintenance free, so that they can be applied to automated machinery that is desired to operate in unmanned workspaces, such as joint actuators for legged robots that can walk freely. Each AC servo motor has a permanent magnet at a rotor and coils at a stator, so that sinusoidal magnetic flux distribution and sinusoidal current cause running torque to the rotor.

Each legged mobile robot generally includes many joints. A servo motor which provides joint degrees-of-freedom is thus required to be designed and produced so as to be compact and highly efficient. For example, the specification of Japanese Patent Application No. 11-33386 (Japanese Unexamined Patent Application Publication No. 2000-299970), which has been already assigned to the applicant of the present invention, discloses a compact AC servo actuator applicable to a joint actuator of legged mobile robots. The AC servo actuator is directly connected to a gear and is of the type in which a servo control system integrated into one chip is housed in a motor unit.

For multi-axis machinery such as a legged mobile robot, rotational position of each axis must be stably detected with high accuracy in order to correctly operate the machinery by a positioning command. For example, it is required for a legged mobile robot of the bipedal upright walking-type, such as a humanoid robot, to autonomously confirm its own posture and position immediately after the power supply is switched on and to move each axis into a stable posture and position.

For this reason, the AC servo actuator which provides the rotational degrees of freedom of each joint must be provided with a higher-precision rotational position detector in order to realize such stabilization of the posture and position.

However, in the servo actuator for legged mobile robots described above, since an actuator unit includes an integrated drive circuit, there is a problem in that a position sensor signal is affected by noise generated in the drive circuit. More specifically, in the actuator unit, application of a magnetic field to a rotor causes the coil current flowing in a stator coil to be switched on and off. Switching noise in such a coil current is inevitably included in the position sensor signal.

For example, an error in the measurement accuracy of a rotation axis due to noise may result in the legged mobile robot becoming destabilized or it may even fall. If the body falls, this not only damages the robot itself but also causes accidents, such as injury to workers near the body and destruction of the object it collided with.

A conventional arrangement of the position sensor is inadequate for detecting the position of a rotation axis with high accuracy. Therefore, a sensor and a detection circuit in which noise influence is considered are needed in order to structurally separate the effects of noise.

However, a position detector in which the influence of noise is reduced needs a complicated circuit structure and high mechanical accuracy. Therefore, the detection sensor and the detection circuit become larger and expensive. Consequently, even the joint actuator itself becomes large and expensive, so that design and assembly of the overall robot becomes difficult and the cost of the apparatus is thus increased.

DISCLOSURE OF INVENTION

It is an object of the present invention to provide an excellent compact servo actuator including a drive circuit and to provide a position detector for the servo actuator.

It is another object of the present invention to provide an excellent servo actuator and a position detector therefor that detect the posture and position of a rotation axis with high accuracy without being affected by switching noise in a coil current from the drive circuit included in the servo actuator.

In view of the above objects, according to a first aspect of the present invention, a servo actuator of a type having a permanent magnet at a rotor and a coil at a stator for generating torque by a magnetic flux distribution and a current passing through the coil includes:

a casing that accommodates the rotor and the stator and supports the rotor rotatably around a predetermined rotation axis;

a drive control unit for controlling the rotation of the rotor by performing PWM (pulse width modulation) switching control on the current passing through the stator coil with a predetermined period;

a rotational position detection unit for detecting the rotational position of the rotor; and a sampling control unit for sampling an output of the rotational position detection unit in synchronization with a switching period of the current passing through the stator coil, in the drive control unit.

Also, according to a second aspect of the present invention, a position detector for a servo actuator of a type having a permanent magnet at a rotor and a coil at a stator for generating torque by a magnetic flux distribution and a current passing through the coil includes:

a drive control unit for controlling the rotation of the rotor by performing PWM (pulse width modulation) switching control on the current passing through the stator coil with a predetermined period;

a rotational position detection unit for detecting the rotational position of the rotor; and a sampling control unit for sampling an output of the rotational position detection unit in synchronization with a switching period of the current passing through the stator coil, in the drive control unit.

The present invention can be applied to a servo actuator having an integrated drive control circuit. The servo actuator can be applied, for example, to a joint actuator of a legged mobile robot. In this type of servo actuator, the drive control unit and the rotational position detection unit are accommodated in the casing. Therefore, the rotational position detection unit is disposed close enough to the drive control unit that the rotational position detection unit is affected by switching noise from the drive control unit.

The rotational position detection unit can be arranged with a combination of a rotor sensor magnet installed on one end face of the rotor approximately coaxially with respect to the rotation axis, the surface of the rotor sensor magnet being sinusoidally magnetized, and two rotational position sensors with a phase difference of approximate 90 degrees between each other arranged around the rotation axis at portions facing the rotor sensor magnet, the rotational position sensors detecting the magnetic flux density.

In the actuator having the integrated drive circuit, a switching current flowing in each coil within the actuator is inevitably included in a position sensor signal of the actuator. In other words, since the rotational position detection unit is disposed near the drive control unit, which functions as a switching noise source, the output signal of each rotational position sensor is superimposed with the switching current, which acts as noise.

Noise from the drive control unit includes this noise, whose fundamental component is shown by a waveform of the switching current, and other noise generated by circuit resonance due to the current variation. In this case, the noise which is superimposed on the output signal can be treated as a periodic signal which is approximately synchronized with the PWM switching period.

In the present invention, the output of the rotational position detection unit is sampled in synchronization with the switching period of the current passing through the stator coil, in the drive control unit. Accordingly, since the size of the signal whose period is identical to that of sampling becomes zero, the influence of the switching noise from the transistor can be eliminated from the sensor signal on which the noise is superimposed, even if the current switching noise is superimposed on the sensor outputs of each rotational position sensor.

A period in which the PWM switch is turned on corresponds to a transitional period of the coil current. During this period, the switching current always fluctuates, thus causing the noise to fluctuate. It is therefore relatively difficult for the noise superimposed on the sensor to be eliminated.

In contrast, during the period in which the PWM switch is turned off, the current variation is relatively stable, even in the transitional period of the coil current. The sampling control unit samples the output of the rotational position detection unit in synchronization with the period in which the drive control unit turns off the current passing through the stator coil, or in synchronization with a timing immediately before the drive control unit turns on the current passing through the stator coil. Consequently, the influence of the switching noise can be reduced.

In particular, in a dead band region allocated immediately before the PWM switch is turned on, it is ensured that the PWM switch is turned off, thus providing a stable period with minimum noise. In other words, in the dead band, the noise component contained in the sensor output is approximately constant and small.

Consequently, the sampling control unit can most efficiently reduce the influence of the switching noise for sampling the output of the rotational position detection unit in synchronization with the dead band.

Further objects, features, and advantages of the present invention will become more apparent from the following more detailed description with reference to an embodiment of the present invention and the attached drawings.

BEST MODE FOR CARRYING OUT THE INVENTION

An embodiment of the present invention will now be described in detail with reference to the drawings.

Figure 1:
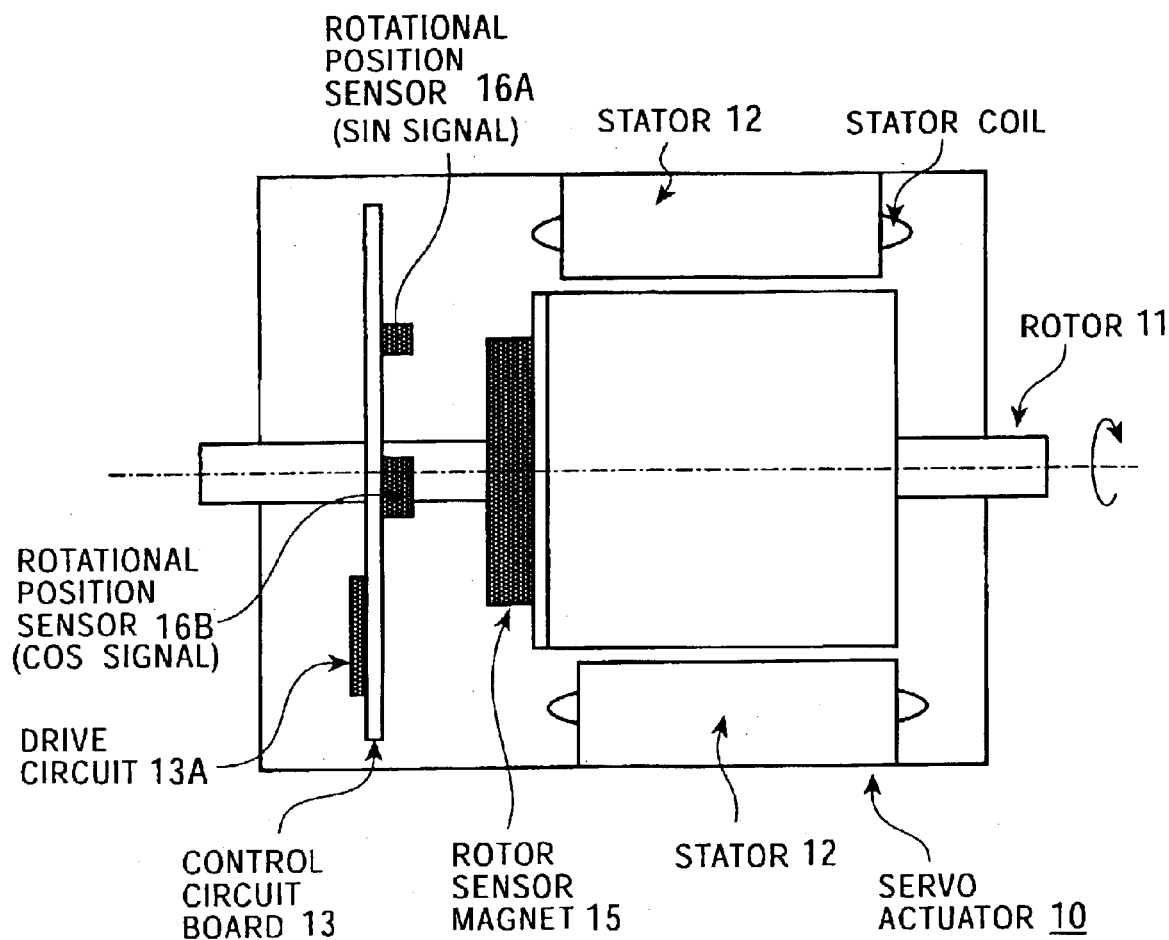
FIG. 1 is an illustration showing a sectional structure of a servo motor 1 according to an embodiment of the present invention taken along the axial direction.

FIG. 1 shows a sectional structure of a servo actuator 10 according to an embodiment of the present invention in the axial direction.

As shown in the drawing, the servo actuator 10 includes, for example, a three-phase stator 12 that is arranged in the circumferential direction around a rotor 11 having a predetermined rotation axis. The rotor 11 is supported so as to be rotatable around the predetermined rotation axis. These rotor 11 and stator 12 are accommodated in a substantially cylindrical casing and constitute a single servo actuator unit.

A permanent magnet is disposed at the rotor 11 and coils are disposed at the stator 12. A sinusoidal current is supplied to the coils to form a predetermined sinusoidal magnetic flux distribution, thus allowing running torque to be applied to the rotor 11.

In the present embodiment, the stator 12 includes three-phase coils composed of U, V, and W phases (described below). Applying an alternating current to each phase generates a magnetic field, thus enabling torque to be applied to the rotor 11. Also, the control of the current applied to each phase enables the control of the running torque applied to the rotor 11.

In order to achieve a servo motor which is smaller in size and which provides higher output, a magnet with a high magnetic flux density may be used at the rotor. For example, a polar anisotropic magnet has a high magnetic flux density, and thus is excellent in achieving higher output. For example, the specification of Japanese Patent Application No. 2000-128409 (Japanese Unexamined Patent Application Publication No. 2001-314050), which has been already assigned to the applicant of the present invention, discloses a servo actuator using a polar anisotropic magnet at the rotor in order to reduce the size and increase the output.

Also, in order to achieve a servo motor which is smaller in size and which provides higher output, each coil of the stator is made more dense. For example, a split core type is adopted for the stator. For the split core type, iron cores, or cores, are arranged in the circumferential direction. Further, after the coils are neatly wound in a separate step, each of them is set up, thus forming the stator. Accordingly, high-density core winding can be obtained, thus making it possible to save space for the actuator. For example, the specification of Japanese Patent Application No. 2000-281072 (Japanese Unexamined Patent Application Publication No. 2002-95192), which has been already assigned to the applicant of the present invention, discloses a servo actuator which adopts a stator of a split core type in order to suitably wind coils.

The servo actuator 10 according to the present embodiment is a compact actuator including a drive circuit 13A accommodated in the same casing. In the example shown in FIG. 1, printed wiring of a predetermined pattern is laid on a control circuit board 13. Also, the drive circuit 13A and its neighboring circuit chips are mounted on the control circuit board 13. The control circuit board 13 is arranged in an approximately disk shape. In the approximate center of the control circuit board 13, an opening for inserting a rotating shaft of the rotor 11 is provided.

Figure 2:
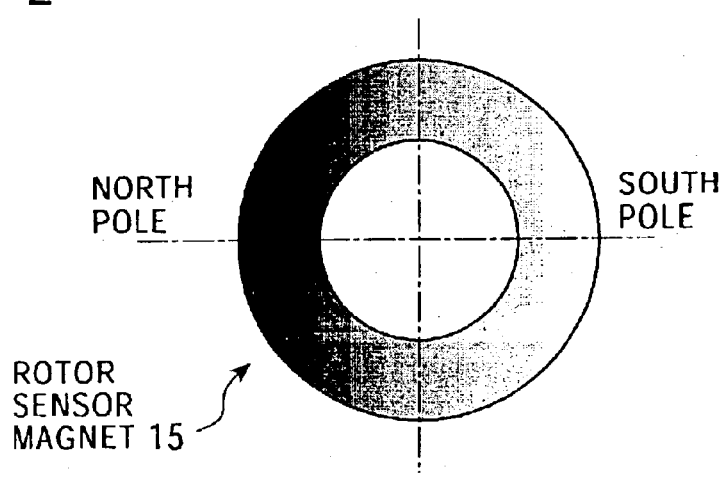
FIG. 2 is an illustration schematically showing that the surface of a rotor sensor magnet 15 is sinusoidally magnetized.

A ring rotor sensor magnet 15 is installed on one end face near the control circuit board 13, of the rotor 11. The surface of the ring rotor sensor magnet 15 is sinusoidally magnetized, as shown in FIG. 2.

The surface of the ring rotor sensor magnet 15 is sinusoidally magnetized (described above), and its magnetic flux density $\phi$ is expressed as a function of the rotational position $\theta_m$ of the rotor 11. In the present embodiment, the magnetic flux density $\phi(\theta_m)$ of the rotor sensor magnet 15 is expressed by the following equation. The positions and number of poles of the sensor magnet 15 are identical to those of a rotating magnet 14.

$$\phi(\theta_m) = \phi_0 \times \sin(\theta_m)$$

The rotational position $\theta_m$ of the rotor 11 arbitrarily changes. Here, the equation $\theta_m = 0$ is defined as expressing a home position of a magnetic polar axis of an output magnet for the rotor 11.

Figure 3:
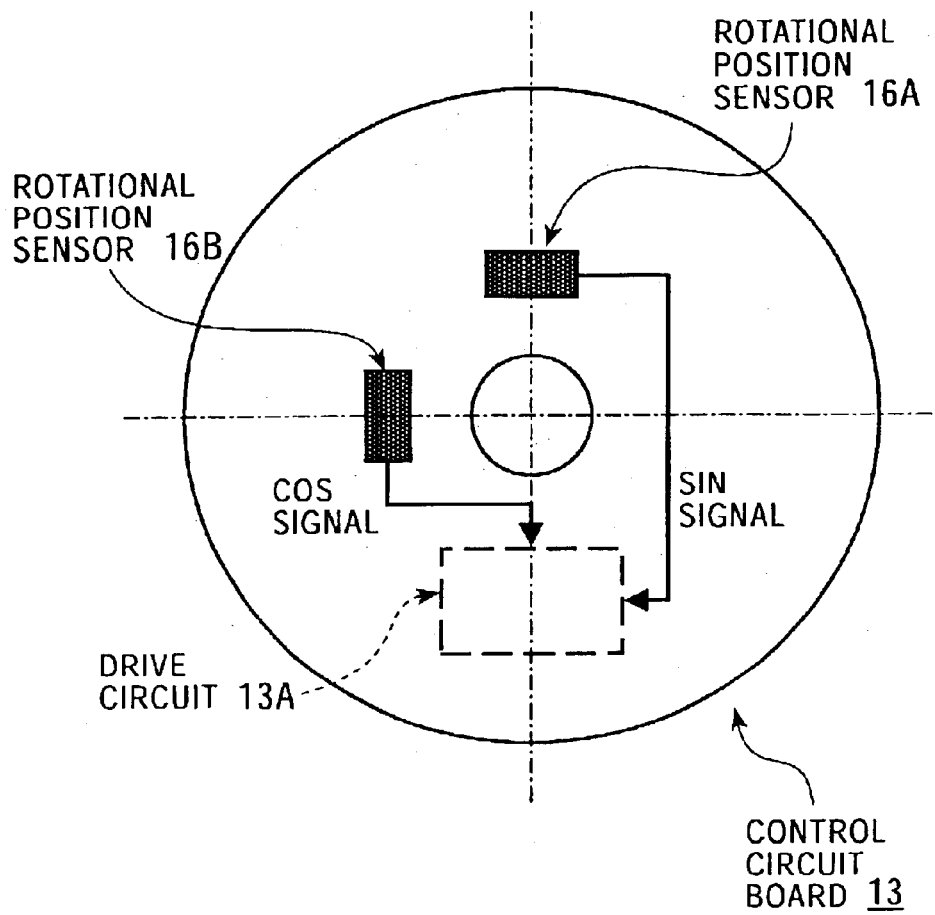
FIG. 3 is an illustration schematically showing that two rotational position sensors 16A and 16B with a phase difference of 90 degrees with respect to a rotation axis are arranged on the surface near a rotor 11, of a control circuit board 13.

In contrast, two rotational position sensors 16A and 16B with a phase difference of 90 degrees are arranged with reference to the rotation axis on the surface near the rotor 11, of the control circuit board 13, as shown in FIG. 3.

The rotational position sensors 16A and 16B include elements (hall elements) which detect the magnetic flux density in the home position of the magnetic polar axis. The rotational position sensor 16A outputs a hall sensor signal SIN corresponding to a magnetic field generated by the rotational sensor magnet. The rotational position sensor 16B similarly outputs a hall sensor signal COS. These SIN signal and COS signal functioning as sensor outputs are input to the drive circuit 13A.

Figure 15:
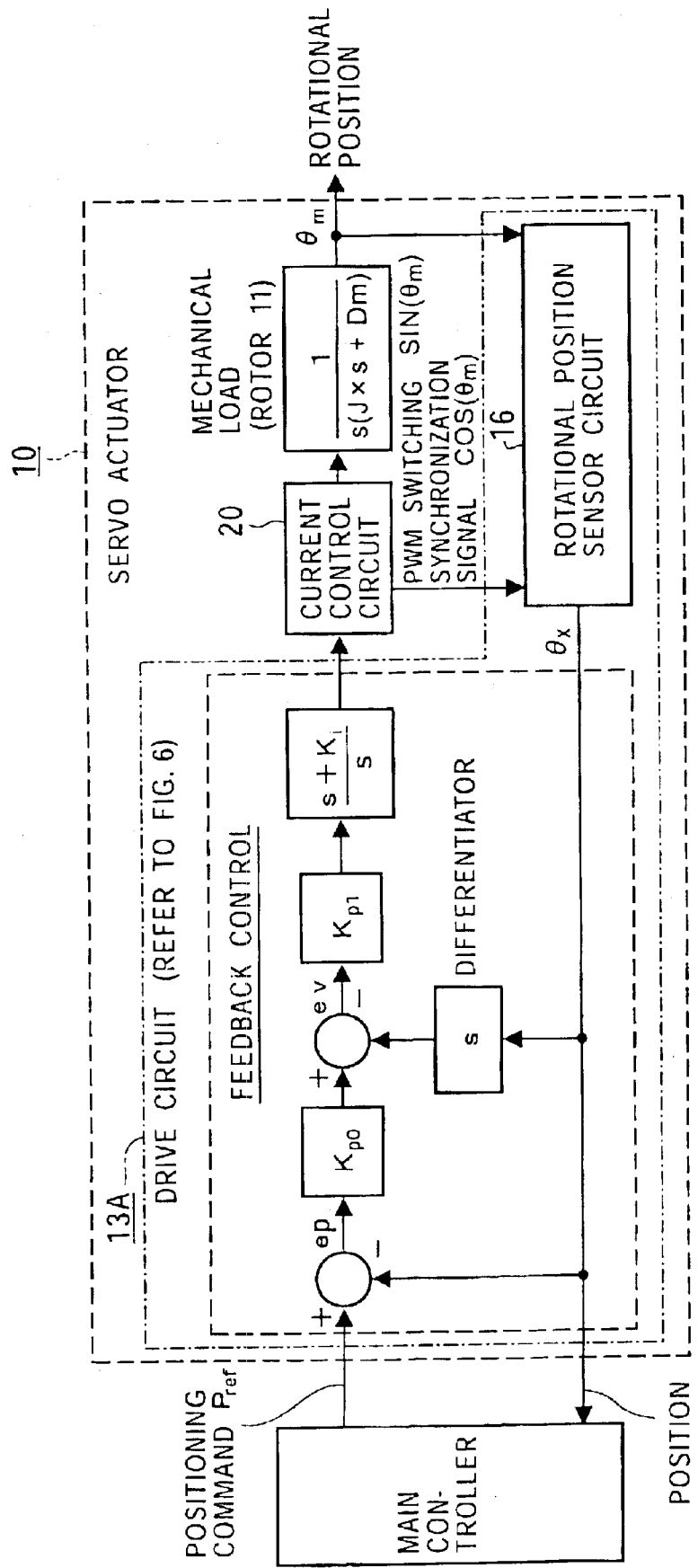
FIG. 15 is a block diagram showing a servo control configuration of the servo actuator according to the present embodiment.

These hall sensor signals SIN and COS represent the rotational position of the servo actuator 10. In other words, the drive circuit 13A performs feedback control of the rotational drive of the actuator motor on the basis of a positioning command from the outside (for example, a main controller). For example, in the case that the servo actuator 10 is applied to a joint actuator of a legged mobile robot, the feedback control of the actuator motor is strongly related to the posture and stability control of the body. FIG. 15 shows a servo configuration of the servo actuator 10.

Each of the hall sensor signals SIN and COS is a function of the rotational position $\theta_m$ of the rotor 11. In the present embodiment, they are expressed as follows:

$$SIN(\phi_m) = G_0(t) \times \phi_0(t) \times \sin\phi_m$$

$$COS(\phi_m) = G_0(t) \times \phi_0(t) \times \left(\sin\phi_m + \frac{1}{2\pi}\right) = G_0(t) \times \phi_0(t) \times \cos\theta_m$$

Figure 4:
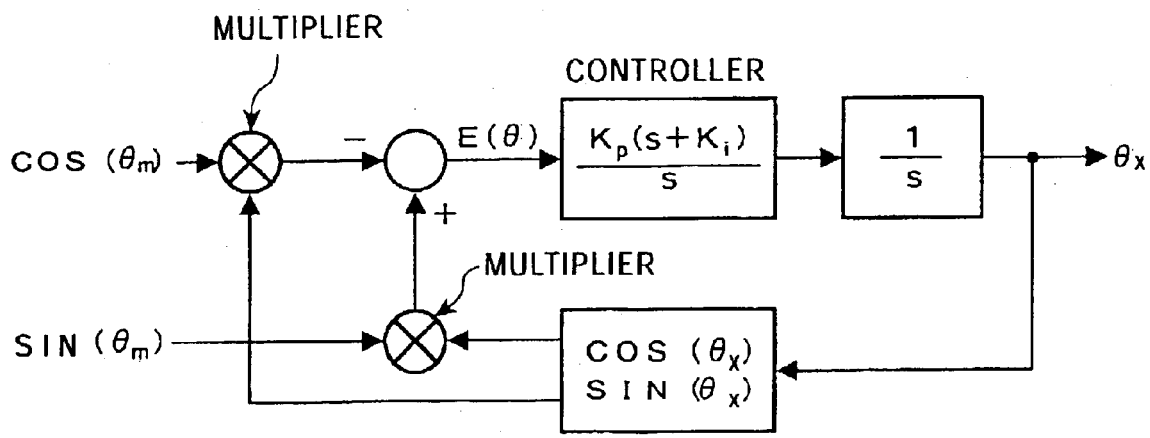
FIG. 4 is an illustration showing an example of the configuration of a feedback tracking circuit for obtaining a rotational position $\theta_m$ from two sensor signals SIN ($\theta_m$) and COS ($\theta_m$).

Here, $G_0(t)$ represents a sensitivity coefficient of the hall sensors. Absolute temperature is represented by t, and $\phi_0(t)$ and $G_0(t)$ vary depending on t. Also, $\phi_0(t)G_0(t)$ is a positive constant The rotational position $\theta_m$ can be obtained from these two sensor signals SIN $(\theta_m)$ and COS $(\theta_m)$ by a feedback tracking circuit FIG. 4 shows an example of the configuration of the feedback tracking circuit.

The error function $E(\theta)$ of the feedback tracking system is expressed as follows:

$$-E(\theta)=SIN\ (\theta_m) \times COS\ (\theta_x) - COS\ (\theta_m) \times SIN\ (\theta_x) = SIN\ (\theta_m - \theta_x)$$

If the condition that the error function $E(\theta)$ is stable, or converges to zero, is satisfied, the following equation holds. Accordingly, $\theta_m$ is obtained.

$$\theta_x = \theta_m$$

Figure 5:
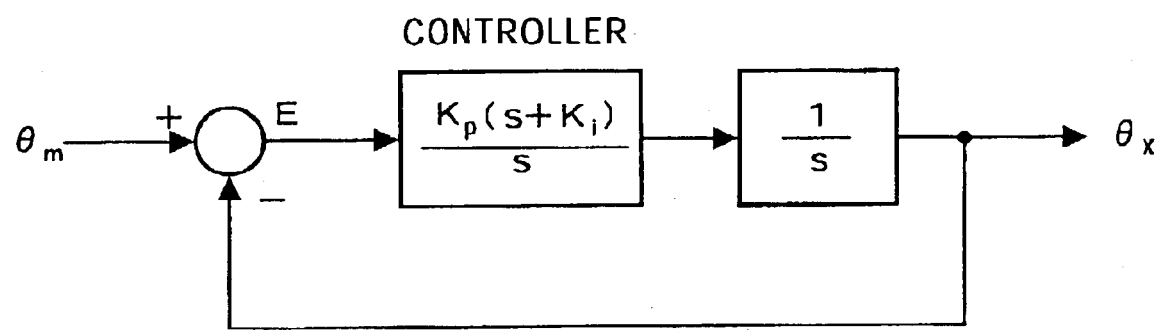
FIG. 5 is an illustration showing the configuration of an approximately equivalent circuit of the feedback tracking circuit shown in FIG. 4.

In this case, the feedback tracking circuit shown in FIG. 4 can be regarded as the configuration of the approximately equivalent circuit shown in FIG. 5. The value of the pole P in the system shown in the drawing is expressed as follows:

$$P = \frac{-K_p \pm \sqrt{K_p^2 - 4K_p K_i}}{2}$$

Consequently, for the stability condition for this system, coefficients $K_p$ and $K_i$ are set so that the value of the pole P is negative. Therefore, the stability condition P<0 becomes $K_p>0$ and $K_i>0$. The response frequency is obtained by the square root of the product of these coefficients $K_p$ and $K_i$.

By the value of $\theta_x$, which is obtained as described above, the position can be detected independently of the sizes of the coefficients $G_0(t)$ and $\phi_0(t)$, which are dependent on temperature t. Consequently, variations in the measurement accuracy of the rotational position due to temperature can be suppressed.

The operation to obtain the rotational position $\theta_m$ of the rotor 11 from the sensor signals SIN $(\theta_m)$ and COS $(\theta_m)$ from the hall sensors 16A and 16B can be achieved by any mode of implementation, such as use of a special hardware circuit or execution of a software program.

Figure 6:
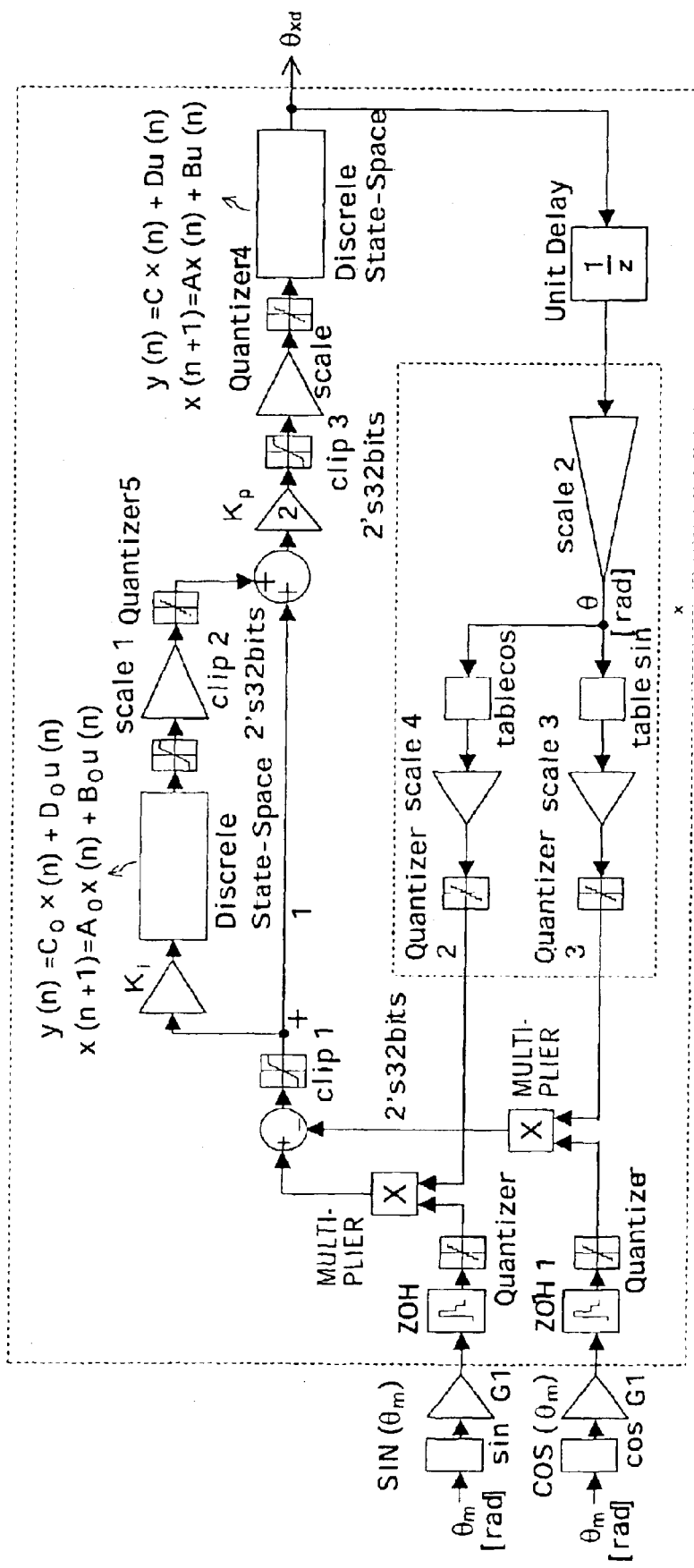
FIG. 6 is an illustration showing an example of the configuration of a digital circuit by which the rotational position $\theta_m$ of the rotor 11 can be obtained from the sensor signals SIN ($\theta_m$) and COS ($\theta_m$) of hall sensors 16A and 16B.

FIG. 6 illustrates an example of the configuration of a digital circuit by which the rotational position $\theta_m$ of the rotor 11 can be obtained from the sensor signals SIN $(\theta_m)$ and COS $(\theta_m)$ from the hall sensors 16A and 16B. In the drawing, if an overflow value is entered, clips 1 and 2 fix the upper or lower limits at the maximum or minimum values of data 32 bits in length. The value of $G_1$ may be any figure as long as it is positive.

The analog sensor signals SIN $(\theta_m)$ and COS $(\theta_m)$ are held and input by a zero-order hold circuit ZOH during a sampling time with a certain period. The equation of the zero-order hold circuit ZOH(s) is the following equation:

$$ZOH(s) = \frac{1 - \exp(-s \times T_0)}{s}$$

In the above equation, s represents the Laplace operator, and $T_0$ represents the sampling period. Also, s can be expressed as jw. By using the equation $\omega s = 2\pi/T_0$, the above equation can be transformed into the following equation:

$$ZOH(jw) = \frac{1 - \exp(-jw \times T_0)}{jw}$$

$$= \frac{2\pi \cdot SIN(\pi \cdot \frac{\omega}{\omega s})}{\omega s \cdot \frac{\pi \omega}{\omega s}} \cdot \exp\left(-j\pi \cdot \frac{\omega}{\omega s}\right)$$

In other words, it can be seen from the above equation that, if an input signal expressed by the equation $\omega = \omega s$ is input, the signal frequency $\omega$ becomes ZOH(jw)=0.

It is also known from the above equation that the original signal can be reproduced if the frequency of the signal is sufficiently lower than the sampling period.

In the circuit configuration shown in FIG. 6, the frequency of the sensor signals SIN $(\theta_m)$ and COS $(\theta_m)$ is sufficiently lower than the sampling period. In the present embodiment, the sampling frequency is set to 20 KHz (50 µs), and the maximum frequency of the sensor signals SIN $(\theta_m)$ and COS $(\theta_m)$ is set to 1 KHz.

Figure 7:
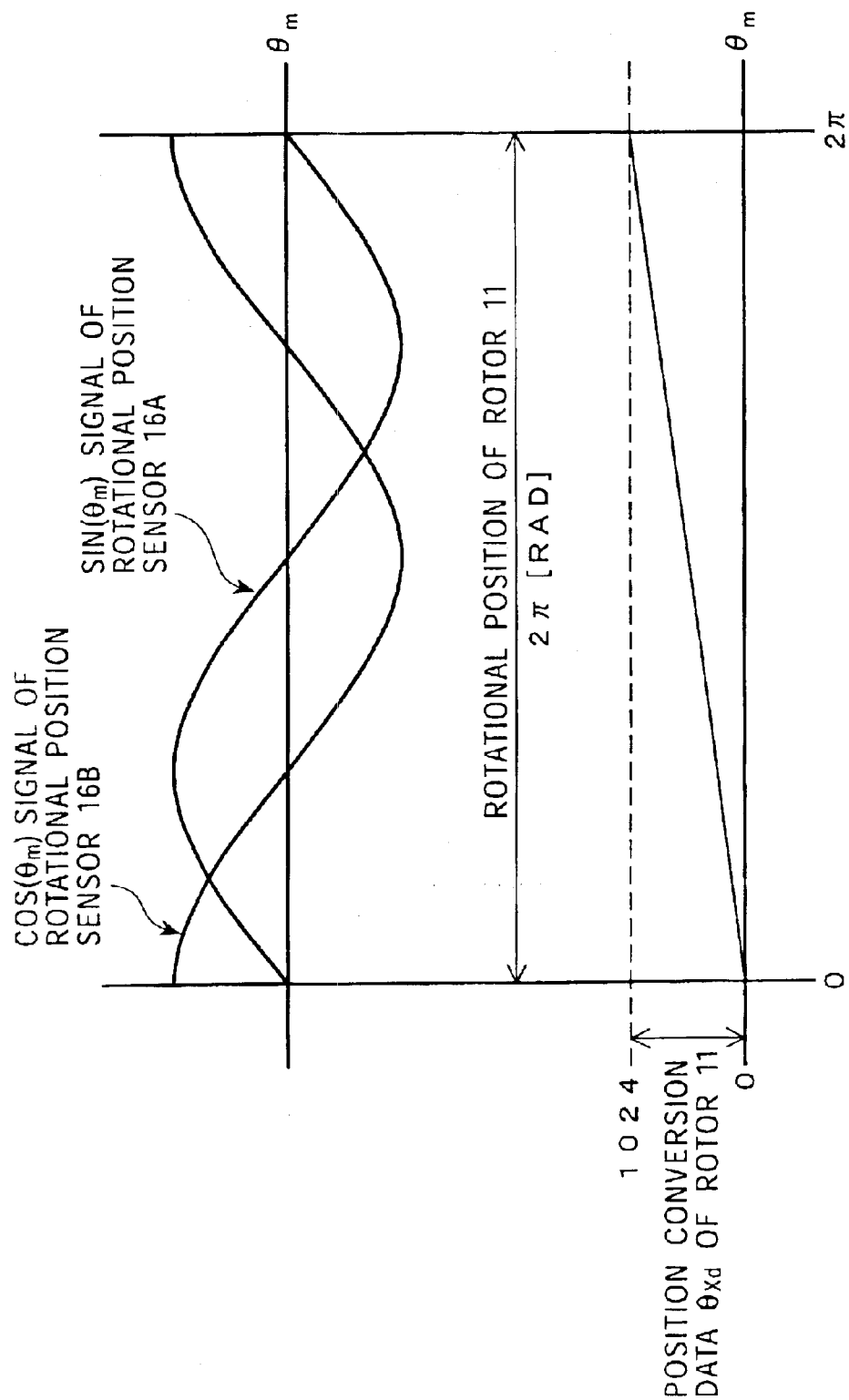
FIG. 7 is a timing chart showing the relationship between input examples of analog sensor signals SIN ($\theta_m$) and COS ($\theta_m$) of the rotor sensors 16A and 16B and an output $\theta_{xd}$ from the digital circuit shown in FIG. 6 in this case.

Assuming that analog sensor signals SIN $(\theta_m)$ and COS $(\theta_m)$ shown in FIG. 7 are input to the rotor sensors 16A and 16B, an output $\theta_{xd}$ of an operation result from the digital circuit at this time becomes as shown in the drawing. However, in practice, the output $\theta_{xd}$ from the digital circuit is a discrete integer value.

The operation by the digital circuit shown in FIG. 6 is arranged so that every operation is performed within a predetermined sampling period. In other words, the circuit output $\theta_{xd}$ is updated every sampling period (50 µs)

As described above, in the servo actuator 10, applying the current to the motor coils wound around the stator 12 generates a magnetic field, thus generating running torque on the rotor 11 which is composed of a magnet. More specifically, the sinusoidal current is applied to the motor coils in order to form a sinusoidal magnetic flux distribution. Then, the servo control of the coil current is performed on the basis of the sensor output including rotational position and speed.

In general, the coil current applied to the coils of each of the U-phase, V-phase, and W-phase, which constitute the stator 12, is controlled by a current control circuit which includes a switching-operating transistor element.

Figure 8:
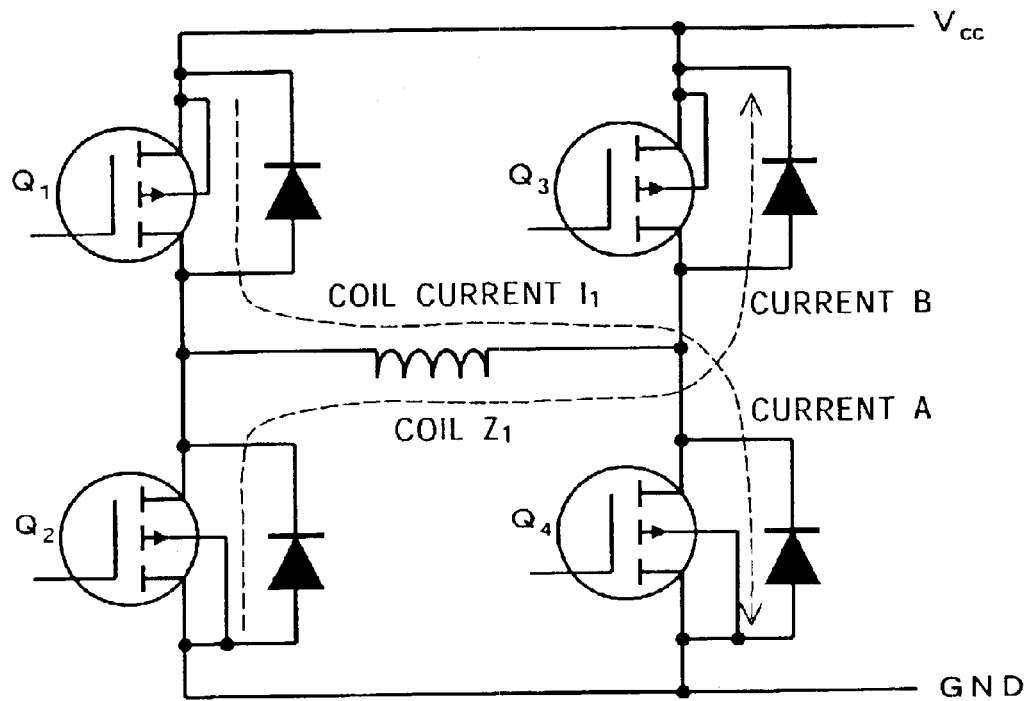
FIG. 8 is an illustration showing an example of the configuration of an equivalent circuit of a current control circuit 20, which is applied to a servo actuator 10 according to the present embodiment, for supplying a coil current.

FIG. 8 illustrates an example of the configuration of an equivalent circuit of a current control circuit 20, which is applied to the servo actuator 10 according to the present embodiment, for supplying a coil current. Such a current control circuit 20 is, for example, arranged at every coil of each phase included in the stator 12.

The current control circuit 20 has a full-bridge configuration including a circuit in which two transistors Q1 and Q2 are connected to each other in the forward direction and another circuit in which two transistors Q3 and Q4 are similarly connected to each other in the forward direction. These two circuits are connected in parallel between a power supply voltage $V_{cc}$ and a ground GND. Also, the midpoint of the transistors Q1 and Q2 and the midpoint of the transistors Q3 and Q4 are connected to each other using a single-phase coil Z1 of the stator 12. Here, Z1 represents one of the U-phase, the V-phase, and the W-phase. Phases other than these phases are arranged by a circuit similar to the circuit shown in the drawing.

Switching on the transistors Q1 and Q4 and switching off the transistors Q2 and Q3 causes a current A to flow in the coil Z1 in the direction indicated by the arrow in the drawing. Then, switching off the transistors Q2 and Q3 and switching off the transistors Q1 and Q4 causes currents A and B to flow in the coil Z1.

The period in which the current A flows by switching on the transistors Q1 and Q4 and switching off the transistors Q2 and Q3 is defined as a region A. The period in which the current B flows by switching off the transistors Q2 and Q3 and switching off the transistors Q1 and Q4 is defined as a region B.

The current $I_1$ flowing in the coil Z1 is a switching current which is determined by the switching control of each transistor. The size of the switching current $I_1$ is determined by a PWM (pulse width modulation) switch, or time widths of the regions A and B.

Figure 9:
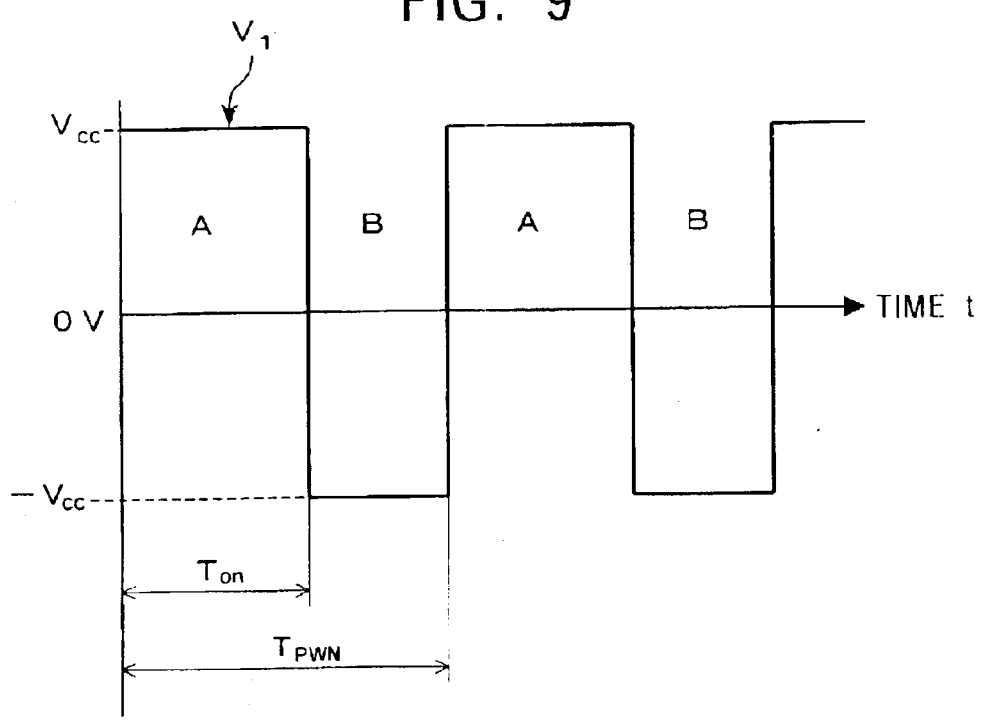
FIG. 9 is a timing chart showing the relationship between PWM switching of each transistor and switching current in the current control circuit 20, and more particularly, showing a voltage waveform of a coil terminal.
Figure 10:
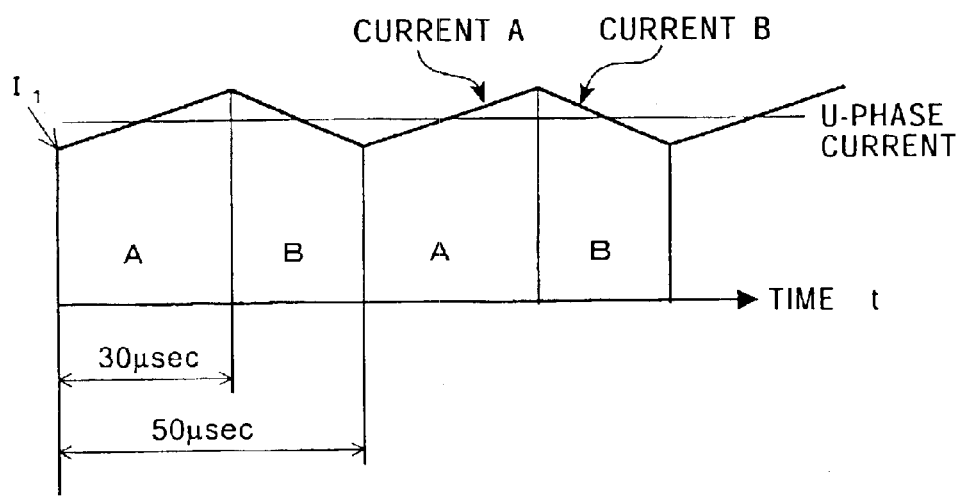
FIG. 10 is a timing chart showing the relationship between the PWM switching of each transistor and the switching current in the current control circuit 20, and more particularly, showing the waveform of the coil current.

FIGS. 9 and 10 show the relationship between the PWM switching of each transistor and the switching current in the current control circuit 20. (FIG. 9 shows a voltage waveform of a coil terminal, and FIG. 10 shows a coil current waveform.) $T_{on}$ represents a pulse width which is determined by the length of the region A, and $T_{PWM}$ represents a certain period of the PWM switching. For example, if $T_{on}$ is 30 $\mu s$ and $T_{PWM}$ is 50 $\mu s$, the current $I_1$ which flows in the coil becomes as shown in FIG. 10.

In general, a PWM switching signal is arranged to control the size of the coil current $I_1$. Its maximum current is determined by the maximum pulse width. The maximum pulse width $T_{onA}$ is determined by the maximum period of the transitional period which is required for switching on and off of each transistor which constitutes the current control circuit 20. In other words, in consideration of the transitional period required for switching on and off of each transistor, the upper limit $T_{onA}$ of the pulse width is set in order that one pair of transistors Q1 and Q4 and the other pair of transistors Q2 and Q3 are not switched on at the same time.

Figure 11:
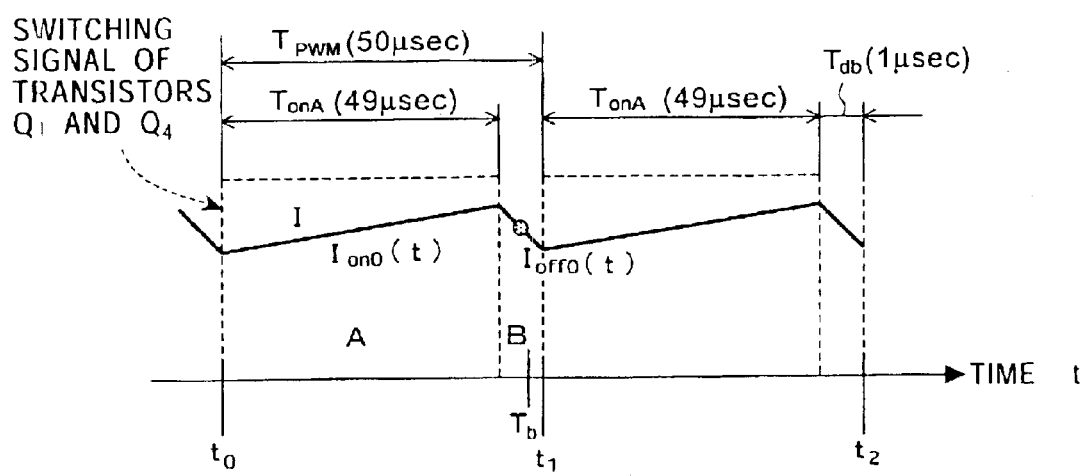
FIG. 11 is a timing chart showing the relationship between the PWM switching of each transistor and the switching current in the current control circuit 20.

The remainder obtained by subtracting the maximum pulse width $T_{onA}$ from the PWM switching period $T_{PWM}$ ensures a dead band. FIG. 11 schematically illustrates that the dead band is ensured by the PWM switching control by the current control circuit 20. In the example shown in the figure, the PWM switching period $T_{PWM}$ is 50 $\mu s$, and a dead band of 1 $\mu s$ is ensured. Consequently, the maximum pulse width $T_{onA}$ becomes 49 $\mu s$.

A signal containing a higher harmonic wave of the switching current in such a current control circuit is defined as a basic noise waveform generated by the drive circuit 13A. The frequency of this waveform can be regarded as a periodic signal which is dependent on the switching frequency.

In the servo actuator 10 according to the present embodiment, as shown in FIG. 1, the circuit board for servo control, such as the drive circuit 13A, is included in the actuator unit which accommodates the actuator main body, such as the rotor 11 and the stator 12, and is arranged integrally in the actuator unit. In other words, the rotational position sensors 16A and 16B for detecting the rotational position of the rotor 11 are disposed near the drive circuit 13A, which functions as a noise source. Consequently, switching current in the current control circuit 20 is inevitably superimposed on the output signals SIN ($\theta_m$) and COS ($\theta_m$) of the rotational position sensors 16A and 16B as noise.

Figure 12:
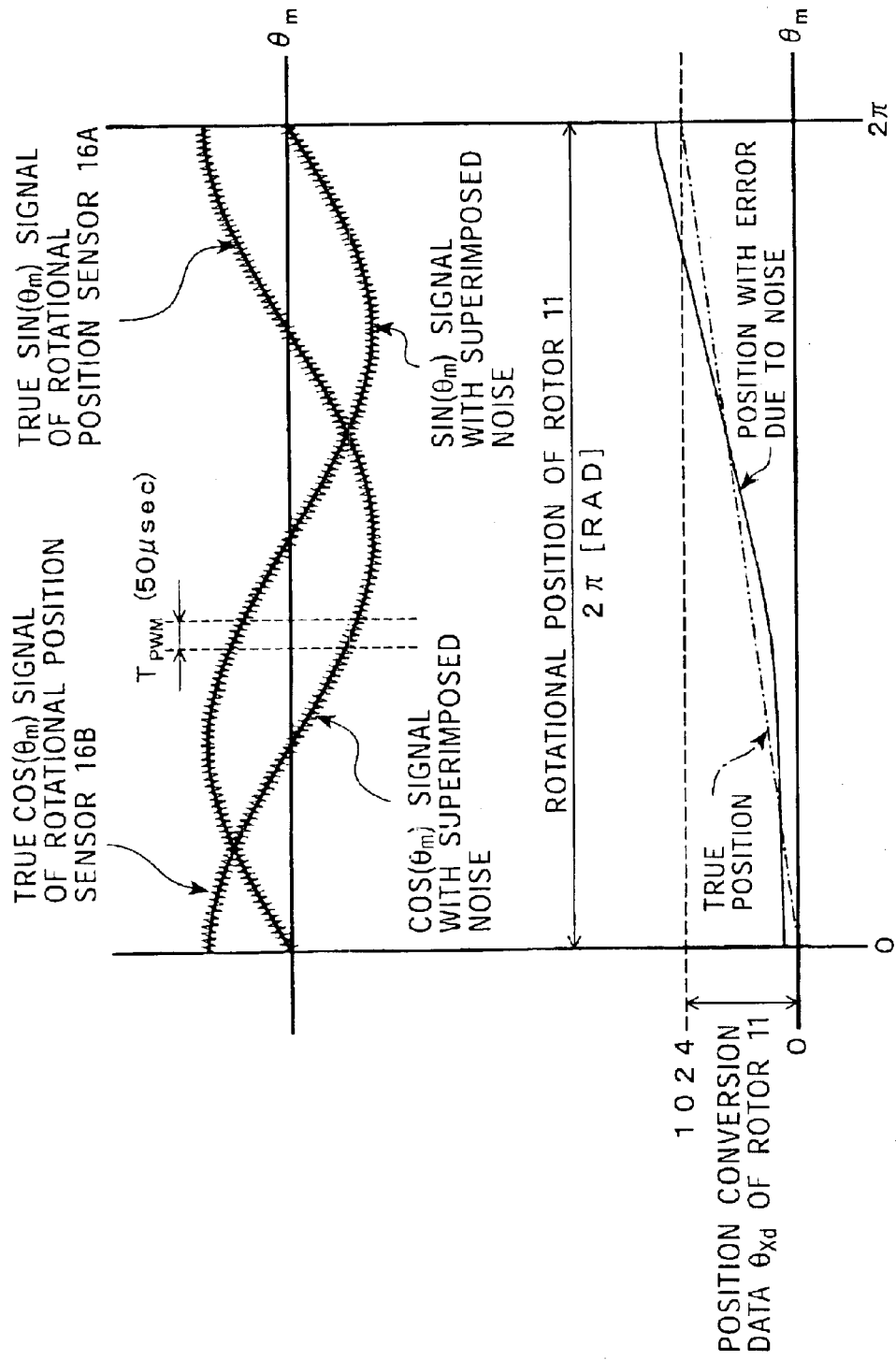
FIG. 12 is a timing chart showing that the sensor output signals SIN ($\theta_m$) and COS ($\theta_m$) of the rotational position sensors 16A and 16B have noise superimposed thereon.

More specifically, noise includes this noise, whose fundamental component is shown by a waveform of the switching current, and other noise generated by circuit resonance due to the current variation. In this case, the noise which is superimposed on the output signals SIN ($\theta_m$) and COS ($\theta_m$) can be regarded as a periodic signal which is synchronized with the PWM switching period $T_{PWM}$. FIG. 12 shows that the sensor output signals SIN ($\theta_m$) and COS ($\theta_m$) of the rotational position sensors 16A and 16B have noise superimposed thereon.

For example, noise elimination can be achieved by a structure in which the current control circuit and the rotational position sensors are mechanically separated from each other and a circuit in which the current control circuit and the rotational position sensors are electrically isolated and separated from each other. However, providing such a mechanical and electrical design for the servo actuator causes the apparatus configuration to become large. This results in preventing miniaturization of the actuator and increasing the apparatus cost.

In the present invention, the rotational position sensors 16A and 16B are arranged so that sampling is performed in synchronization with the PWM signal of the current control circuit, which is the fundamental frequency of the current noise. With this arrangement, since the size of the signal whose period is identical to that of sampling becomes zero, even if the current switching noise is superimposed on the sensor outputs SIN ($\theta_m$) and COS ($\theta_m$) of the rotational position sensors 16A and 16B, the influence of the switching noise from the transistor can be eliminated from the sensor signal on which noise is superimposed.

Referring to FIG. 11, the region A corresponding to the period in which the PWM switch is turned on corresponds to the transitional period of the coil current. During this period, the switching current always fluctuates, thus causing the noise to fluctuate. It is therefore relatively difficult for the noise superimposed on the sensor to be eliminated.

In contrast, in the region B corresponding to the period in which the PWM switch is turned off, current variation is relatively stable even in the transitional period of the coil current. In particular, in the dead band region allocated immediately before the PWM switch is turned on, it is ensured that all transistors constituting the PWM switch are turned off, thus-providing a stable period with minimum noise. In other words, in the dead band, the noise component contained in the sensor outputs SIN ($\theta_m$) and COS ($\theta_m$) is approximately constant and small.

Consequently, by arranging the rotational position sensors 16A and 16B so as to be sampled in synchronization with the dead band region, the influence of switching noise can be most efficiently reduced.

Among the noise frequency components contained in a true signal, frequencies higher than the response frequency of the rotational position detection system are attenuated, thus enabling the influence of the noise components having frequency more than the required frequency to be attenuated. In the frequency range handled by the rotational position detection system, since such noise is constant as described above, the signal can also be kept constant. In other words, the error is constant. Therefore, the output accuracy includes a constant error.

In general, servo motors often handle speed signals as well as position signals. In that case, speed may be detected using the difference of position and using a state observer. In any case, a differential position signal is used. It is known that constant noise does not influence the detection system.

In the state in which a current is not applied to the motor and the high frequency noise is small (in other words, in the region B and immediately before the region A) in the rotational position detection system according to the present embodiment, a current is not applied to the stator coil. Therefore, more accurate position information can be obtained. Even if large a current flows in the stator coil and the ratio of noise thus becomes increased, the ratio is kept constant. Accordingly, high-frequency noise which causes adverse effects on the measurement accuracy of the rotational position can be reduced.

FIG. 12 shows waveforms of the sensor output signals SIN ($\theta_m$) and COS ($\theta_m$) of the rotational position sensors 16A and 16B on which noise is superimposed. The sensor signals are input in synchronization with the PWM switching period $T_{PWM}$ indicated by dotted lines, so that the influence of errors due to switching noise can be reduced. In particular, the influence at high frequencies is significantly attenuated. Although the influence of noise appears in the sensor output signals SIN ($\theta_m$) and COS ($\theta_m$) as a mode of offset, the offset has a small effect on the detection system.

Figure 13:
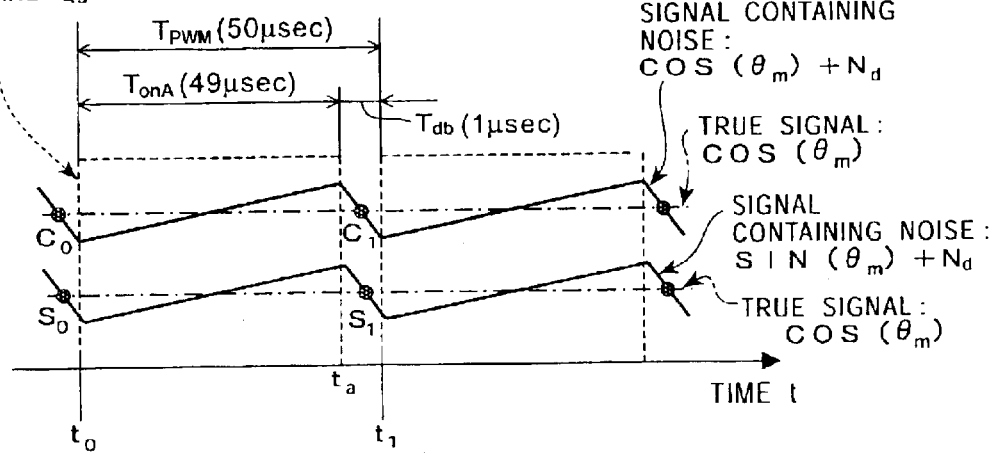
FIG. 13 is a timing chart showing that the sensor output signals SIN ($\theta_m$) and COS ($\theta_m$) are sampled in synchronization with a PWM switching period $T_{PWM}$ from the rotational position sensors 16A and 16B on which switching noise is superimposed.

FIG. 13 shows that the sensor output signals SIN ($\theta_m$) and COS($\theta_m$) are sampled in synchronization with the PWM switching period $T_{PWM}$ from the rotational position sensors 16A and 16B on which switching noise is superimposed. An example shown in the figure shows that the sensor output signals SIN ($\theta_m$) and COS ($\theta_m$) are sampled in synchronization with the PWM switching period $T_{PWM}$ using the dead band region.

The sensor signals containing noise generated by the switching current in the current control circuit are produced by superimposing approximately constant-sized noise, which is similar to the current waveform, on the true sensor signals SIN ($\theta_m$) and COS ($\theta_m$) The waveforms of the sensor signals are expressed by the full lines shown in FIG. 13.

During this time, if the signals immediately before $t_1$, that is after $t_a$, are sampled in synchronization with the switching frequency of the current control circuit with a predetermined period $T_{PWM}$, signals can be obtained at each point $C_0$, $C_1$, $S_0$, and $S_1$, as shown in FIG. 13.

These signals at points $C_0$, $C_1$, $S_0$, and $S_1$ are constant values due to the characteristics of sampling. Assuming that the difference of the thus obtained signals and the true sensor signals SIN ($\theta_m$) and COS ($\theta_m$) is $N_d$, then $N_d$ can be expressed as follows:

$$N_d \approx C_0 - \text{COS}(\theta_m) \approx S_0 - \text{SIN}(\theta_m) \approx \text{constant}$$

In the above equation, since the sampling interval $T_{PWM}$ is sufficiently smaller than the time variation of $\theta_m$, the following equations can be obtained: $C_0 = C_1$ and $S_0 = S_1$.

As described above, by sampling the outputs of the rotational position sensors 16A and 16B in synchronization with the signals due to switching noise, the noise $N_d$ which is superimposed on the sensor outputs can be regarded as a constant value. Therefore, the feedback tracking circuit for obtaining the rotational position $\theta_x$ from the two sensor signals SIN ($\theta_m$) and COS ($\theta_m$) can be expressed by an equivalent circuit shown in FIG. 14.

Figure 14:
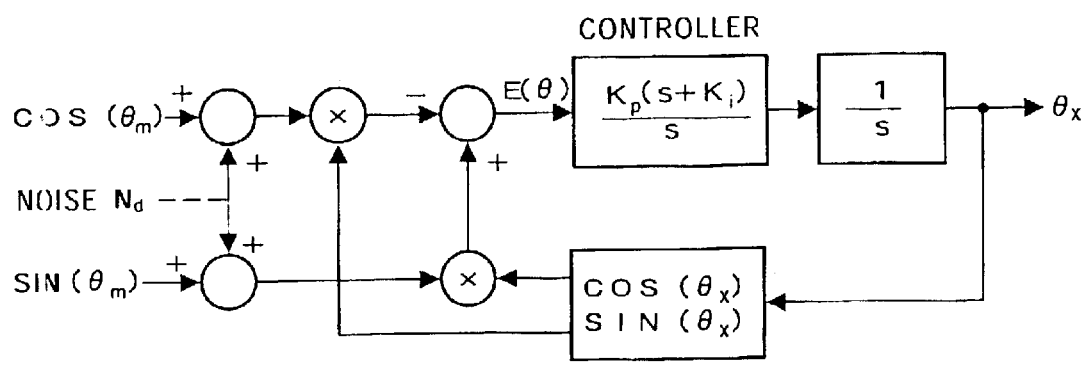
FIG. 14 is an illustration showing an equivalent circuit of a feedback tracking circuit that can treat noise $N_d$ which is superimposed on the sensor output as a constant value by sampling the outputs of the rotational position sensors 16A and 16B (the tracking circuit is mounted in a drive circuit 13A).

In the configuration of the equivalent circuit shown in FIG. 14, the error function E($\theta$) can be expressed as follows:

$$E(\theta) = (\text{SIN}(\theta_m) + N_d) \times \text{COS}(\theta_X) - (\text{COS}(\theta_m) + N_d) \times \text{SIN}(\theta_X)$$
$$= \text{SIN}(\theta_m - \theta_x) + N_d(\text{COS}(\theta_x) - \text{SIN}(\theta_x))$$

The noise size $N_d$ of the signal, which is sampled in synchronization with the noise, can be made smaller and is constant. Therefore, the state of convergence is expressed as E($\theta$)=0 from the convergence condition of the detection system. Accordingly, the output $\theta_x$ of the equivalent circuit shown in FIG. 14 can be expressed by an approximate equation as follows:

$$\theta_x \approx \theta_m + N_d(\text{COS}(\theta_x) - \text{SIN}(\theta_x))$$

As described above, the noise $N_d$ is regarded as a constant value. Therefore, $\theta_x$ is a signal of a true rotational position $\theta_m$ containing a constant offset in which a higher harmonic wave accompanying transistor switching of the current control circuit is not included. Also, as is clear from the above equation, if the equations $\theta_x = \pi/4$ and $\theta_x = 3\pi/4$ are satisfied, there is a measurement position at which the influence of noise becomes zero.

Accordingly, because the noise $N_d$ is regarded as being constant, the output $\theta_x$ of the equivalent circuit is shown as a continuous curve which varies depending on the noise, as shown in FIG. 11.

FIG. 15 shows a servo control configuration of the servo actuator according to the present embodiment.

The feedback system shown in FIG. 15 handles state variables of a position signal and its differential signal. If noise containing some higher harmonic waves is included in the position signal $\theta_x$ or $\theta_{xd}$, a problem occurs in that vibration is excited by noise in this system.

In accordance with the present invention, even if the servo actuator is arranged to be compact and includes the integrated drive circuit by arranging the rotational position sensors and the current control circuit close to each other, the influence of the switching noise can be reduced, as described above.

APPENDIX

While the present invention has been described in detail with reference to a particular embodiment, it is obvious that modifications and substitutions of the embodiment may be made by those skilled in the art without departing from the scope of the present invention. In other words, the present invention has been disclosed as merely an example and should not be interpreted in a restrictive manner. In order to determine the scope of the present invention, the claims section at the beginning of the Description should be considered.

INDUSTRIAL APPLICABILITY

According to the present invention, an excellent servo actuator and position detector therefor which are applicable to multi-axis drive machinery, such as robots, general purpose assembly equipment, robot hands, and other types of multi-axis controllers can be provided.

Also, according to the present invention, an excellent servo actuator including a drive circuit and a position detector for the servo actuator can be provided.

Further, according to the present invention, an excellent servo actuator and a position detector therefor that can detect the posture and position of a rotation axis with high accuracy without being affected by switching noise in a coil current from the drive circuit included in the servo actuator can be provided.

In the servo actuator according to the present invention, arranging of a detection circuit for performing sampling in synchronization with noise enables a rotational position which does not contain higher harmonic waves to be detected, even if switching noise in a motor coil current of the actuator itself is generated. Also, the position detector according to the present invention can be arranged so as to be compact and inexpensive, thus not preventing miniaturization of the servo actuator and not increasing the cost of the overall apparatus.

In the case that the servo actuator according to the present invention is applied to a bipedal upright-walking legged mobile robot, the influence of noise can be eliminated, thus allowing posture and position control with less vibration to be realized. Also, since the size of the servo, actuator is reduced, the size of a portion near each joint does not increase. Therefore, a balanced and attractive body can be designed.

In general, in the feedback control system of the servo actuator, differentiation of a position signal, is often used. Therefore, a signal containing higher harmonic noise waves causes more adverse effects on the system than the problem of noise offset. According to the present invention, by sampling sensor signals at a timing that is synchronized with transistor switching in a current control circuit, such a problem of the higher harmonic waves can be eliminated. Consequently, in the servo actuator having the integrated drive circuit, more stable control can be achieved by using a small and inexpensive circuit.

What is claimed is:

1. A servo actuator of a type having a permanent magnet at a rotor and a coil at a stator for generating torque by a magnetic flux distribution and a current passing through the coil, the servo actuator comprising:
    a casing that accommodates the rotor and the stator and supports the rotor rotatably around a predetermined rotation axis;
    a drive control unit for controlling the rotation of the rotor by performing PWM (pulse width modulation) switching control on the current passing through the stator coil with a predetermined period;
    a rotational position detection unit for detecting the rotational position of the rotor; and
    a sampling control unit for sampling an output of the rotational position detection unit in synchronization with a switching period of the current passing through the stator coil, in the drive control unit.

2. A servo actuator according to claim 1, wherein the drive control unit and the rotational position detection unit are accommodated in the casing, and
    wherein the rotational position detection unit is disposed close enough to the drive control unit that the rotational position detection unit is affected by switching noise from the drive control unit.

3. A servo actuator according to claim 1, wherein the rotational position detection unit includes:
    a rotor sensor magnet installed on one end face of the rotor approximately coaxially with respect to the rotation axis, wherein the surface of the rotor sensor magnet is sinusoidally magnetized; and
    two rotational position sensors with a phase difference of approximate 90 degrees between each other arranged around the rotation axis at portions facing the rotor sensor magnet, the rotational position sensors detecting the magnetic flux density.

4. A servo actuator according to claim 1, wherein the sampling control unit samples the output of the rotational position detection unit in synchronization with a period in which the drive control unit turns off the current passing through the stator coil.

5. A servo actuator according to claim 1, wherein the sampling control unit samples the output of the rotational position detection unit in synchronization with a timing immediately before the drive control unit turns on the current passing through the stator coil.

6. A servo actuator according to claim 1, wherein the drive control unit includes a dead band which maintains an "off" state for a predetermined period of time immediately before the current passing through the stator coil is turned on, and
    wherein the sampling control unit samples the output of the rotational position detection unit in synchronization with the dead band.

7. A position detector for a servo actuator of a type having a permanent magnet at a rotor and a coil at a stator for generating torque by a magnetic flux distribution and a current passing through the coil, the position detector comprising:
    a drive control unit for controlling the rotation of the rotor by performing PWM (pulse width modulation) switching control on the current passing through the stator coil with a predetermined period;
    a rotational position detection unit for detecting the rotational position of the rotor; and
    a sampling control unit for sampling an output of the rotational position detection unit in synchronization with a switching period of the current passing through the stator coil, in the drive control unit.

8. A position detector for a servo actuator according to claim 7, wherein the drive control unit and the rotational position detection unit are accommodated in a casing which accommodates the rotor and the stator and supports the rotor rotatably around a predetermined rotation axis, and
    wherein the rotational position detection unit is disposed close enough to the drive control unit that the rotational position detection unit is affected by switching noise from the drive control unit.

9. A position detector for a servo actuator according to claim 7, wherein the rotational position detection unit includes:
    a rotor sensor magnet installed on one end face of the rotor approximately coaxially with respect to the rotation axis, wherein the surface of the rotor sensor magnet is sinusoidally magnetized; and
    two rotational position sensors with a phase difference of approximate 90 degrees between each other arranged around the rotation axis at portions facing the rotor sensor magnet, the rotational position sensors detecting the magnetic flux density.

10. A position detector for a servo actuator according to claim 7, wherein the sampling control unit samples the output of the rotational position detection unit in synchronization with a period in which the drive control unit turns off the current passing through the stator coil.

11. A position detector for a servo actuator according to claim 7, wherein the sampling control unit samples the output of the rotational position detection unit in synchronization with a timing immediately before the drive control unit turns on the current passing through the stator coil.

12. A position detector for a servo actuator according to claim 7, wherein the drive control unit includes a dead band which maintains an "off" state for a predetermined period of time immediately before the current passing through the stator coil is turned on, and
    wherein the sampling control unit samples the output of the rotational position detection unit in synchronization with the dead band.

* * * * *